US012671639B2

(12) United States Patent
    Kovah

(10) Patent No.: US 12,671,639 B2
(45) Date of Patent: Jun. 30, 2026

(54) SYSTEM FOR BLUETOOTH DEVICE INDENTIFICATION AND PROCESS THEREFOR

(71) Applicant: Dark Mentor LLC, Colesville, MD (US)

(72) Inventor: Xeno Kovah, Colesville, MD (US)

(73) Assignee: Dark Mentor LLC, Colesville, MD (US)

( * ) Notice: Subject to any disclaimer, the term of this patent is extended or adjusted under 35 U.S.C. 154(b) by 105 days.

(21) Appl. No.: 18/938,418

(22) Filed: Nov. 6, 2024

(65) Prior Publication Data

US 2026/0128968 A1 May 7, 2026

(51) Int. Cl.
*H04L 43/026* (2022.01)
*H04L 43/022* (2022.01)
*H04W 4/80* (2018.01)

(52) U.S. Cl.
CPC .......... *H04L 43/026* (2013.01); *H04L 43/022* (2013.01); *H04W 4/80* (2018.02)

(58) Field of Classification Search
CPC ....... H04L 43/026; H04L 43/022; H04W 4/80
See application file for complete search history.

(56) References Cited

U.S. PATENT DOCUMENTS

| | | | | |
|---|---|---|---|---|
| 11,272,016 B2 * | 3/2022 | Wang | .................... | H04L 67/125 |
| 2007/0123165 A1 | 5/2007 | Sheynman et al. | .......... | 455/41.2 |
| 2010/0015919 A1 | 1/2010 | Tian | ............................. | 455/41.2 |

| | | | | |
|---|---|---|---|---|
| 2013/0090061 A1 * | 4/2013 | Linde | ...................... | H04W 4/80 |
| | | | | 455/41.2 |
| 2014/0355517 A1 * | 12/2014 | Reunamaki | ........... | H04W 8/005 |
| | | | | 370/328 |
| 2020/0236004 A1 | 7/2020 | Tavares et al. | | |
| 2021/0058393 A1 | 2/2021 | Alpert et al. | | |
| 2022/0312507 A1 | 9/2022 | Wang et al. | | |

OTHER PUBLICATIONS

Device discovery and tracing in the Bluetooth low energy domain (Year: 2023).*
Extended European Search Report mailed Apr. 7, 2026, issued in parallel European Patent Application No. 25211116.6.
Kavisankar L et al: "A Novel Strategy for the Identification of the Operating System of Bluetooth-Enabled Devices for Security Audit", 2024 11th International Conference on Internet of Things: Systems, Management and Security (IOTSMS) IEEE, Sep. 2, 2024 (Sep. 2, 2024), pp. 50-57, XP034727486, DOI: 10.1109/IOTSMS62296. 2024.10710276.

* cited by examiner

*Primary Examiner* — Shirley X Zhang
(74) *Attorney, Agent, or Firm* — Stein IP, LLC

(57) ABSTRACT

A computing system and process for performing identification of the type of computing devices communicating via wireless Bluetooth protocols. The computing system involves customized or non-customized computing systems that are configured to send queries via all protocols described in Bluetooth specifications, as well as vendor-specific protocols. The computing system analyzes raw data, in combination with behavioral data, in combination with ground-truth data about known devices, in order to establish a device identification about any computing device communicating via Bluetooth. In the absence of ground-truth data, device identification is inferred with an associated confidence level based on synthesis across all collected data.

20 Claims, 8 Drawing Sheets

FIG. 1

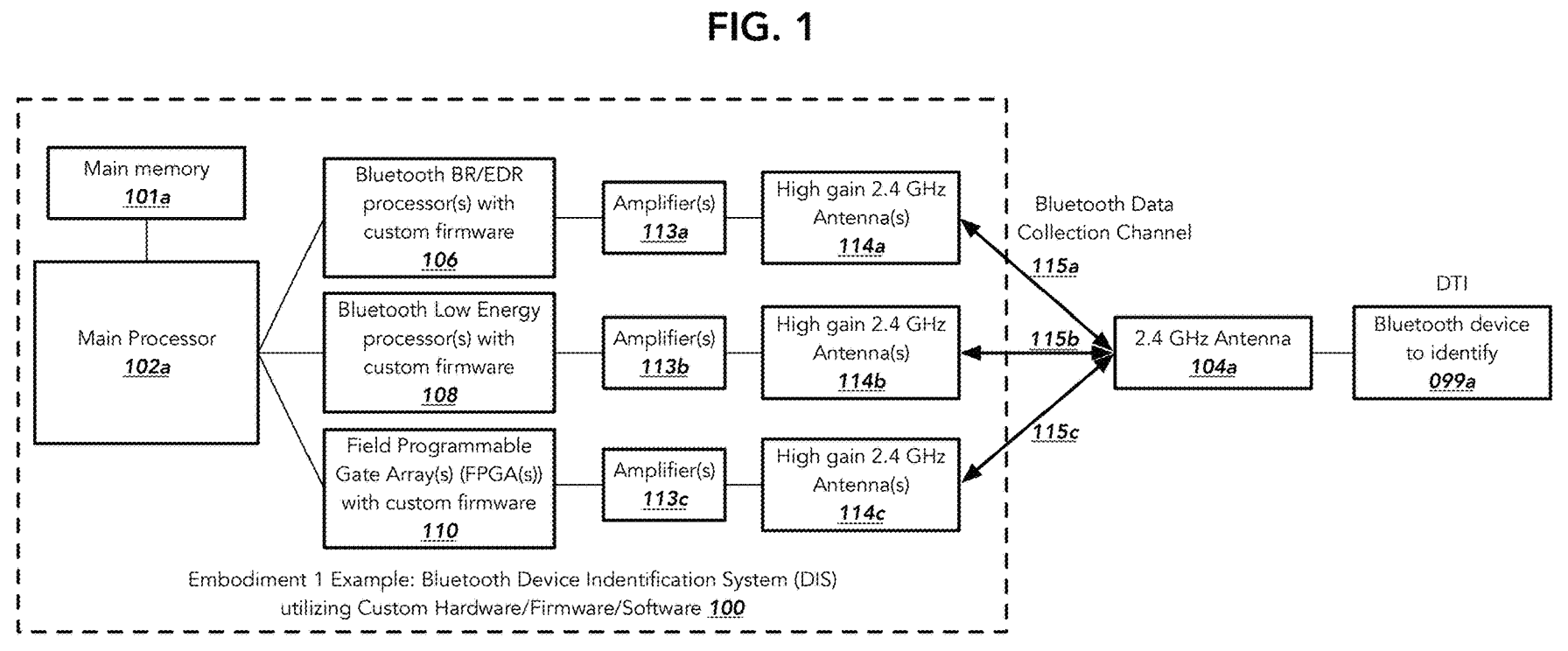

DTI

Bluetooth device to identify *099a*

2.4 GHz Antenna *104a*

Bluetooth Data Collection Channel

*115a*  *115b*  *115c*

High gain 2.4 GHz Antenna(s) *114a*

High gain 2.4 GHz Antenna(s) *114b*

High gain 2.4 GHz Antenna(s) *114c*

Amplifier(s) *113a*

Amplifier(s) *113b*

Amplifier(s) *113c*

Bluetooth BR/EDR processor(s) with custom firmware *106*

Bluetooth Low Energy processor(s) with custom firmware *108*

Field Programmable Gate Array(s) (FPGA(s)) with custom firmware *110*

Main memory *101a*

Main Processor *102a*

Embodiment 1 Example: Bluetooth Device Indentification System (DIS) utilizing Custom Hardware/Firmware/Software *100*

Embodiment 2 Example 1: Bluetooth Device Indentification System (DIS)
Utilizing Commercial Off The Shelf Personal Computer (COTS PC)

Main memory
*101b*

Main Processor
*102b*

Bluetooth Low Energy
and/or BR/EDR
processor
*103b*

2.4 GHz Antenna
*104b*

Bluetooth Data
Collection Channel
*115d*

2.4 GHz Antenna
*104c*

DTI

Bluetooth device to
identify
*099b*

Embodiment 2 Example 2: Bluetooth Device Indentification System (DIS) Utilizing Commercial Off The Shelf Mobile Phone/Tablet (COTS Phone/Tablet)

Main memory
101c

System on a Chip (SoC) with embedded Main Processor and Bluetooth Low Energy and/or BR/EDR processor
105

2.4 GHz Antenna
104d

Bluetooth Data Collection Channel
115e

DTI

Bluetooth device to identify
099c

2.4 GHz Antenna
104e

SYSTEM FOR BLUETOOTH DEVICE INDENTIFICATION AND PROCESS THEREFOR

STATEMENT REGARDING FEDERALLY SPONSORED RESEARCH OR DEVELOPMENT

Not applicable.

COPYRIGHT NOTICE

BACKGROUND OF THE INVENTIVE CONCEPT

1. Field of the Invention

The present inventive concept relates to a computing system configured for Bluetooth device identification and a process therefor, and more particularly, to a computing system configured for Bluetooth device identification that utilizes multiple Bluetooth protocols and other Bluetooth related data, and a process therefor.

2. Description of the Related Art

The Bluetooth wireless protocol for information transfer was defined in 1999. Subsequent updates introduced Bluetooth Enhanced Data Rate (EDR) and were defined in 2004, and the prior Bluetooth wireless protocol was retroactively named Basic Rate (BR). These protocols are collectively referred to as Bluetooth BR/EDR. The Bluetooth Low Energy protocol was defined in 2009 and added many new technologies and protocols which were not compatible with BR/EDR. These technologies and protocols are collectively referred to herein as BLE.

Bluetooth defines the notion of a "Profile" as a document describing the "required functions and features of each layer in the Bluetooth system" ("Bluetooth Core Specification 6.0", (2024) https://www.bluetooth.com/specifications/specs/core-specification-6-0/). It also says that "[a] profile defines the vertical interactions between the layers as well as the peer-to-peer interactions of specific layers between devices." Therefore, Bluetooth Profiles can be thought of as supplemental specifications that go beyond the Bluetooth Core Specification. They contain additional data and behaviors that can optionally be conformed to by devices to achieve interoperability. Profiles can be public and standardized, or private and vendor-specific.

Prior work to identify Bluetooth devices falls into 4 categories. Category 1 Bluetooth device identification systems are those which attempt to identify a single device over time, irrespective of what type of device it is. A common use case for such systems is performing access control, and granting access to a single authorized device, while preventing access to other devices which may attempt to impersonate an authorized device. US 2022/312507 A1 Wang et al. and US 2021/058393A1 Alpert et al. are examples of such systems. Another common use case is tracking a single device over time, despite the fact that the primary Bluetooth Device Address (BDADDR) is designed to change over time, to intentionally make tracking more difficult. US 2020/236004 A1 Tavares et al. is an example of this. Unlike the present system as disclosed herein, these systems are not concerned with differentiating and identifying, e.g., as an Apple® iPhone vs. a Samsung® TV.

Category 2 Bluetooth device identification systems are those that seek to create a fingerprint for a specific device based on device-specific wireless characteristics. This category often overlaps with Category 1 (e.g. both US 2022/312507 A1 Wang et al. and US 2021/058393 A1 Alpert et al. use these techniques.) While the present system as disclosed herein can include such fingerprint systems as another source of the multi-source information as described herein, this information is not a prioritized data source. That is because such information primarily serves to identify individual devices (i.e. Device #1 vs. Device #2) over time, but it does not contribute as significantly to what type of device it is. I.e. it is not a strong signal to differentiate that Device #1 is an iPhone and Device #2 is a TV. Physical-layer characteristic fingerprinting is more indicative of the Bluetooth chip radio hardware, and consequently it is primarily suitable for differentiating that Device #1 uses Bluetooth Chip Vendor #1 and Device #2 uses Bluetooth Chip Vendor #2. But that is only one aspect of the overall device identification that the present inventive system as described herein achieves.

Category 3 Bluetooth device identification systems are those that use a single source of data to create a Device ID (DID) "fingerprint" for a Device To Identify (DTI). Examples include "*Automatic Fingerprinting of Vulnerable BLE IoT Devices with Static UUIDs from Mobile Apps*" (2019) by Zuo et al. (https://web.archive.org/web/20191124060800/https://web.cse.ohio-state.edu/~lin.3021/file/CCS19a.pdf) and "*Fingerprinting Bluetooth-Low-Energy Devices Based on the Generic Attribute Profile*" (2021) by Celosia and Cunche (https://inria.hal.science/hal-02359914/file/paper.pdf). Both papers use a single source of data Generic Attribute Profile (GATT). GATT information comprises a hierarchy of "Services" and "Characteristics". The former paper collected only the hierarchy information, and calls that a fingerprint. The latter paper collects that information, and information one layer deeper, by reading concrete values out of the GATT Characteristics. But both fingerprints completely ignore other information available via other protocols, Profiles, and behavioral information. Another example of a single-data-source system is "*Bluetooth Low Energy Device Identification Based on Link Layer Broadcast Packet Fingerprinting*" (2023) by Zhang et al. (https://gitlab.com/XenoKovah/bluetooth-security-timeline/-/blob/main/paper-mirror/ZhangJinghui_whitepaper_Bluetooth_Low_Energy_Device_Identification_Based_on_Link_Layer_Broadcast_Packet_Fingerprinting.pdf). In that system they analyze only BLE advertisement data. Almost every system described in academic work is single-data-source system. Our system collects and synthesizes data from a comprehensive set of protocols, Profiles, and behaviors; including ones not described in any prior related work.

Category 4 Bluetooth device identification systems are those which are multi-data-source. There is a single such system described in the academic literature, "*Fingerprinting and analysis of Bluetooth devices with automata learning,*" (2022) by Pferscher and Aichernig (https://arxiv.org/pdf/2211.16074). This is also the only system that incorporates behavioral analysis into its attempt to fingerprint a device. This system explores the state machines of DTIs by using a technique known as "fuzzing", where data for a few packet types is randomized, and potentially made invalid, in an automated fashion. This approach has only been applied to a limited set of protocols such as BLE Link Layer (LL) control packets, Security Manager Protocol (SMP), and the Attribute Protocol (ATT). The result is the generation of a state machine which represents the edges as packet types and the nodes as presumed internal states for a target DTI. However, this system takes hours to generate a baseline DID for a DTI. Such a system is not appropriate for performing device identification on demand for the hundreds or thousands of Bluetooth devices which are present in busy environments. This system cannot create a DID for a device that is not under the system-owner's control, and for which they already have ground-truth about what the device is. I.e. it can create two DIDs, but it cannot determine whether one is for an Apple® iPhone and one is for an Apple® MacBook, unless the system is explicitly informed which type of device each DID corresponds to. And this system also did not seek to identify minimum-differentiation-sequences within state machines, which can be used to differentiate devices in the fewest queries possible, rather than trying all possible permutations. Our system in contrast can create high confidence and meaningful DIDs even in the absence of ground-truth. And our system focuses on behavioral analyses for device identification which are performant (completed within seconds) and scalable to populations of thousands of simultaneous DTIs.

Accordingly, there is a need for a system that can detect and differentiate different types of devices.

There is also a need for a system that can initiate a connection to other devices in question to detect and differentiate different devices from one another by the synthesis of device identification from multi-source acquisition of data from all protocol layers, Profiles, and behaviors.

There is also a need for a system that can perform identification of the type of device communicating by wireless Bluetooth protocols by sending queries via all possible protocols described in Bluetooth specifications, as well as vendor-specific protocols.

There is also a need for a system that can collect raw information and behavioral information about a device communicating via the Bluetooth wireless protocols to identify the device's model, manufacturer, Bluetooth chip(s) in use, Bluetooth chip(s) vendor(s), software/firmware versions, etc.

There is also a need for a system that can collect raw information and behavioral information about a device communicating via the Bluetooth wireless protocols to determine which specific Bluetooth chips are inside these Bluetooth communication devices in order to determine whether the device is vulnerable to over-the-air wireless exploitation of the Bluetooth firmware.

There is also a need for a system that not only makes use of state machine inference mechanisms, but also adds the capability to generate a minimal-differentiator packet sequence from the differences between two or more state machines.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 1 illustrates a system for synthesizing information about a Bluetooth device's identity, according to an example embodiment of the present inventive concept.

Figure 2:
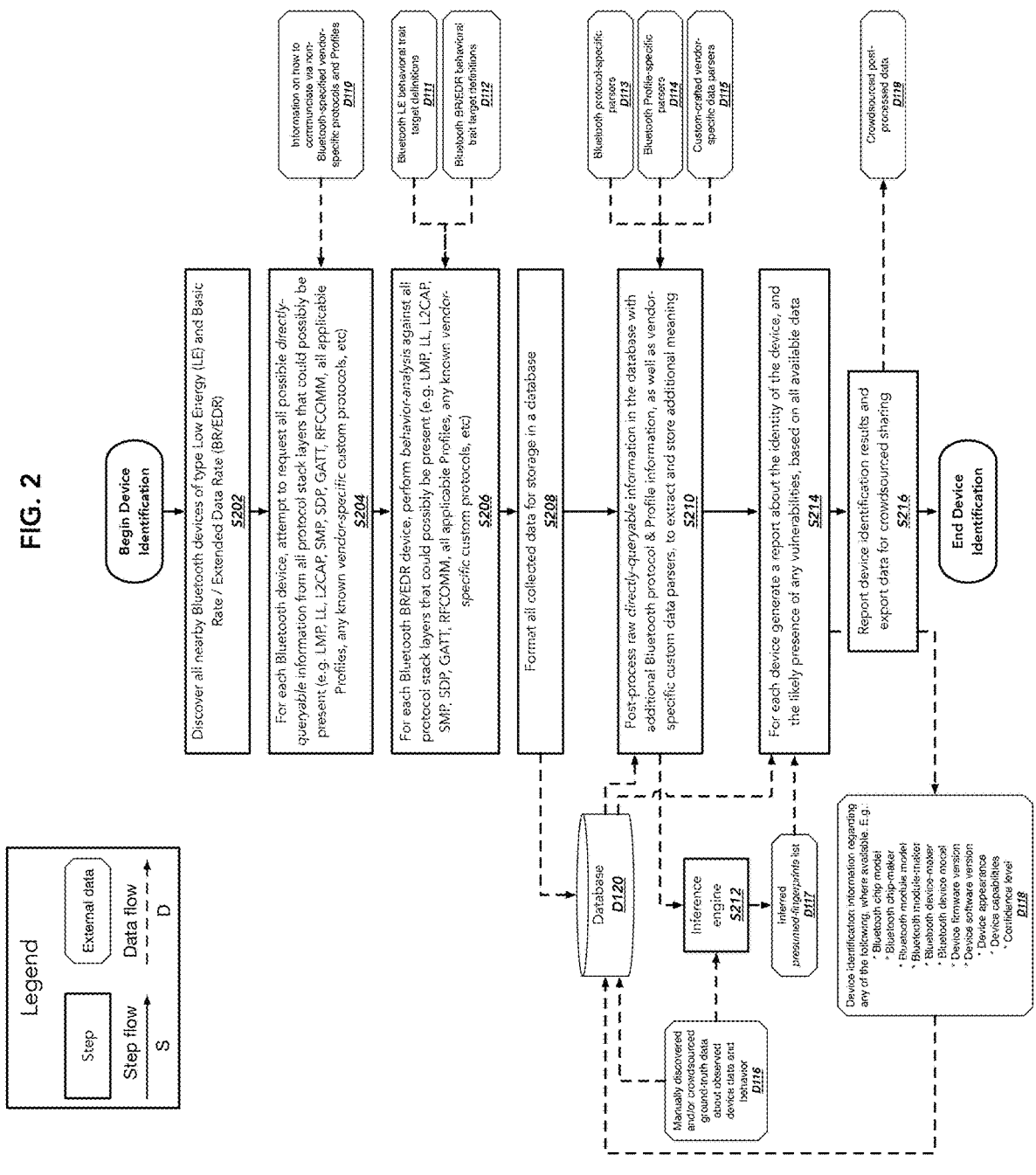
FIG. 2 illustrates a process for synthesizing various types of information about a Bluetooth device's identity, according to an example embodiment of the present inventive concept.

The drawing illustrates a process for making the invention according to an example embodiment of the present inventive concept and is not to be considered limiting in its scope, as the overall inventive concept may admit to other equally effective embodiments.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted for brevity of the detailed description.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to the intentions of the lexicographer herein, case precedents, or the appearance of new technologies. Also, some terms may be arbitrarily selected by the inventors, and in this case, the meaning of the selected terms will be described in detail in the detailed description herein. Thus, the terms used herein should be defined based on the generally defined meaning of the terms together with the description throughout this specification.

Hereinafter, one or more exemplary embodiments of the present general inventive concept will be described in detail with reference to accompanying drawings.

Example embodiments of the present general inventive concept are directed to a computing system configured for Bluetooth device identification and a process therefor, and more particularly, to a computing system configured for Bluetooth device identification that utilizes multiple Bluetooth protocols and other Bluetooth related data, and a process therefor.

FIG. 1 illustrates a block diagram of a Bluetooth Device Identification System (DIS) 100 for synthesizing various different information about a Bluetooth DTI and determining a DID D118 thereof, according to an example embodiment of the present inventive concept. The DIS 100 according to this example embodiment is a custom-designed DIS 100 that is optimized for maximally-flexible Bluetooth transmit/receive functionality through the inclusion of custom hardware, firmware, and software, including reconfigurable hardware such as Field Programmable Gate Arrays (FPGAs), and is designed to optimize for ideal device identification capabilities. For example, this DIS 100 can include a main processor 102a and a main memory 101a, and multiple Bluetooth chips/processors that support BR/EDR 106, and BLE 108. On subsequent figures, all Steps can be assumed to be performed by a program stored in main memory 101a and executing on the main processor 102a. Bluetooth chips can either support both BR/EDR and BLE, or support only a single technology. Further, there can be more than one of each such chip (or processor) to allow querying many DTIs in parallel. Each such chip can also be running customized firmware that does not reject packets sent to it by the main processor 102a, that do not conform to the Bluetooth specification, but which will instead be sent as-is over the air. The customized firmware residing on Bluetooth chips can also allow the main processor 102a to craft packets which are not normally within the main processor's purview, according to standard Bluetooth division of responsibilities between the main processor 102a and the Bluetooth processors 106, 108, etc. Each Bluetooth chip can be connected to an amplifier 113 (113a-113b), so that if the chip itself does not support transmitting at the maximum allowable power, the transmit power is amplified before sending. Further, each Bluetooth chip 106, 108, etc., can be connected to a high gain antenna 114 (114a-114b) to ensure that responses from physically-distant DTIs can be received. Additionally, the customized hardware included in DIS 100 according to this example embodiment can make use of reconfiguration hardware such as a Field Programmable Gate Array(s) FPGA 110. Such reconfigurable hardware is capable of being configured into a Software-Defined Radio (SRD) transceiver which is capable of transceiving on all 40 (2 MHz-wide) BLE or 80 (1 MHz-wide) BR/EDR radio frequency (RF) channels in parallel in the 2.4 GHz radio spectrum. This FPGA 110 can also be connected to an amplifier 112c and a high gain antenna 114c, similar to that of Bluetooth chips 106 and 108. The purposes of the Bluetooth chip(s) and/or FPGA(s) is to serve as the sender/receiver for over-the-air Bluetooth wireless transmissions to/from the DTI, at the direction of the main processor 102a.

The DIS 100 illustrated in the example embodiment of FIG. 1 can be implemented according to an example process as described with reference to FIG. 2.

FIG. 2 illustrates a process for synthesizing various types of information about a Bluetooth DTI's DID D118, according to an example embodiment of the present inventive concept. Referring to FIG. 2, the present example process begins detecting all nearby Bluetooth devices of type BLE and BR/EDR which are in the area at Step S202. This Step S202 includes using the discovery procedures which are defined in the Bluetooth Core Specification. But this Step S202 can also include any non-standardized discovery procedures which are known, such as listening on Bluetooth wireless channels with a Software-Defined Radio (SDR) to discover devices which are not actively in discoverable mode ("*Blue's Clues: Practical Discovery of Non-Discoverable Bluetooth Devices*" (2023) by Tucker et al. https://ieeexplore.ieee.org/stamp/stamp.jsp?tp=&arnumber=10179358).

For each Bluetooth communication device discovered, DIS 100 at Step S204 attempts to request all possible directly-queryable information from all layers that could possibly be present. During Step S204 of the process the DIS 100 iterates through all levels of the BR/EDR and BLE protocol stacks, and sends packets to all discovered DTIs in order to aid in generating a DID D118. The term "protocol stack" is used herein to refer to specific packet types and procedures for the use of those packets which are outlined in the Bluetooth specification, and where one protocol may layer or "stack on top of" another protocol if the higher layer protocol data may be encapsulated in a lower layer protocol data unit (PDU). The Bluetooth specification may refer to what is also described as a "protocol stack layer" as a physical channel, physical link, logical transport, logical link, or specific packetized protocols or packet types like DM1, SCO, HV1, HV2, HV3, DV, eSCO, EV3, EV4, EV5, 2-EV3, 2-EV5, 3-EV5, ACL, DM1, DH1, DM3, DH3, DM5, DH5, AUX1, 2-DH1, 2-DH3, 2-DH5, 3-DH1, 3-DH3, or 3-DH5. It is to be noted that this list of protocols or packet types is not exhaustive, and as new packet types and protocols are introduced in newer specifications, this system can be simply updated to make use of newer packet types and protocols without departing from the spirit and scope of the overall present inventive concept.

Examples of Bluetooth protocol stack layers for BR/EDR implementation can include the Inquiry Scan Physical Channel, Page Scan Physical Channel, Link Manager Protocol (LMP), and Service Discovery Protocol (SDP). Examples of Bluetooth protocol stack layers for BLE implementation can include the advertisement packet types (e.g. ADV_IND, ADV_SCAN_IND, ADV_DIRECT_IND, ADV_NON-CONN_IND, etc) sent over the advertisement physical channels, and the Link Layer (LL) protocol.

Some protocols, such as Link Layer Control and Adaptation Protocol (L2CAP) or the Security Manager Protocol (SMP), are technically shared by both the BR/EDR and BLE protocol stacks. However, in practice only some packet types and capabilities are shared, and others are exclusively available for only BR/EDR or only BLE. Similarly, some higher level protocols, for example the Attribute (ATT) protocol can technically be used by both BR/EDR and BLE, but in practice they primarily see adoption via BLE implementation.

The iteration through information collection sources of interest is also performed with respect to Bluetooth "Profiles". Profiles are supplementary information to the Bluetooth Core Specification that outline inter-layer behaviors and dependencies, as well as how devices talk between each other in order to achieve interoperability. For example, there can be a Bluetooth Profile for how bathroom scales will transmit and format information such as weight, body mass index, etc., and what services they must expose for clients to request that information. The definition of this Profile allows a bathroom scale maker's phone application, or $3^{rd}$ party applications, to know how to communicate with any scale that conforms to the Profile. Step S204 utilizes information from the Bluetooth Core Specification but also from all Bluetooth Special Interest Group (SIG) official Profiles. In this way the Step S204 process can delve deeper into the data, to find information such as Bluetooth-SIG-defined company IDs which can suggest a possible device maker or Bluetooth chip maker. It is to be noted that Step S204 is not limited to only the official Bluetooth-SIG-defined information and can also take advantage of information about vendor-specific protocols and data which has been published in open literature, such as patent applications ("*Synchronization of multi-channel audio communicated over Bluetooth Low Energy*", U.S. Pat. No. 9,712,266 B2 by Linde et al.), public research work ("*Discontinued Privacy: Personal Data Leaks in Apple Bluetooth-Low-Energy Continuity Protocols*"0 (2020) by Celosia and Cunche (https://petsymposium.org/popets/2020/popets-2020-0003.pdf)), or our own private research. Vendor-specific information is imported via separate protocol and Profile definitions given in data D110 and is used as part of the Step S204 processing.

Figure 2A:
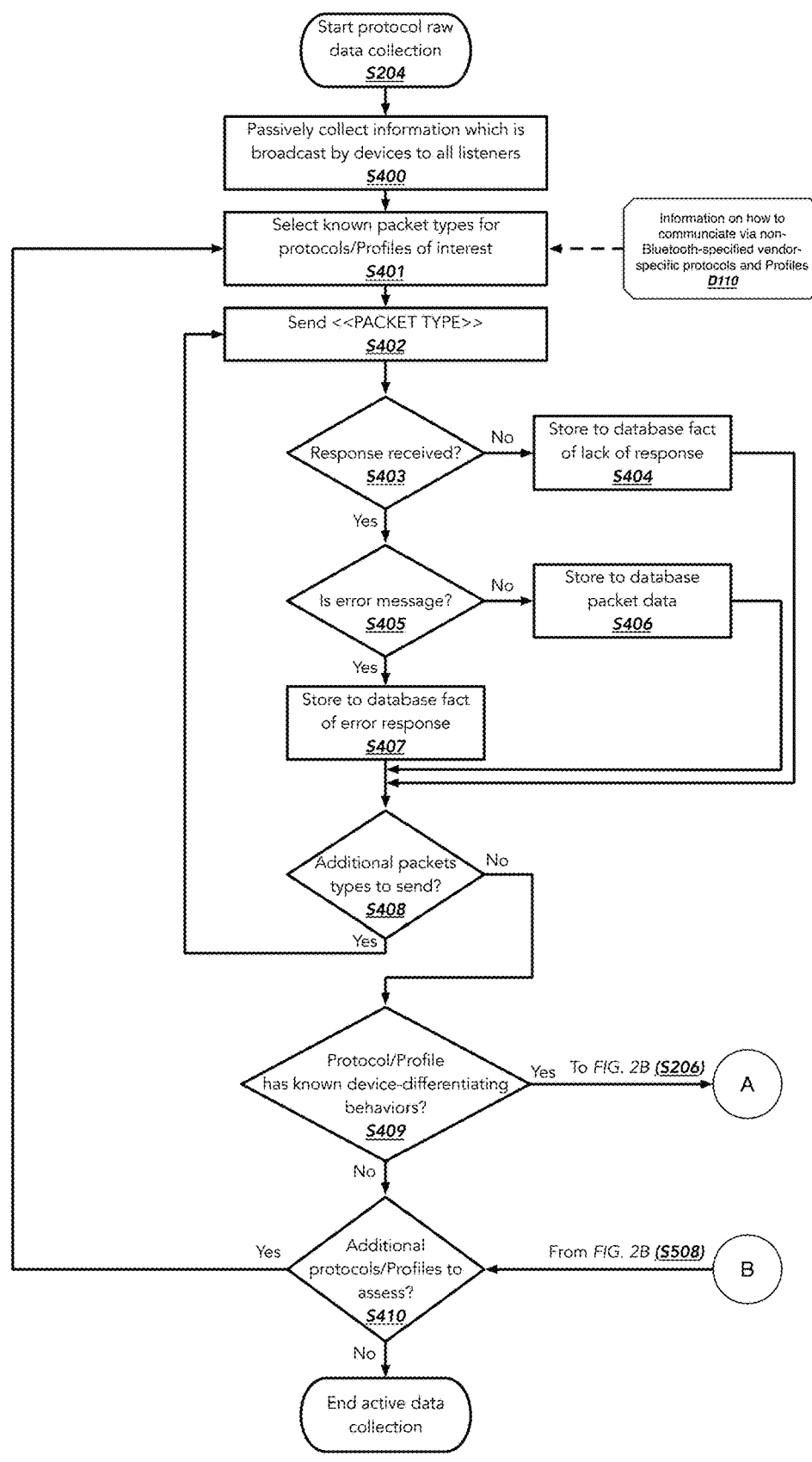
FIG. 2A illustrates a sub-process of raw data collection by iterating through all levels of BR/EDR and BLE protocol stacks and sending packets to all discovered devices to identify in order to generate a DID D118 for all Bluetooth communication devices, according to the process of FIG. 2.

Step S204 will now be described in greater detail with reference to FIG. 2A. FIG. 2A illustrates a sub-process (Step S204) of raw data collection by iterating through all levels of BR/EDR and BLE protocol stacks and Profiles and sending packets to all discovered devices to generate a DID D118 for all DTIs, according to the process illustrated in the example embodiment of FIG. 2.

Referring to FIG. 2A, the sub-process of Step S204 of FIG. 2 begins with Step S400. Step S400 includes a process of collecting raw information that a DTI may be broadcasting about itself. For example, in a BR/EDR this can include advertisement data (AdvData) included within an Extended Inquiry Response (EIR) packet as part of the discovery process. For BLE this can be AdvData within an advertisement packet (e.g. ADV_IND, ADV_NONCONN_IND, etc.). AdvData can include Bluetooth standardized information, such as a complete or incomplete device name, the device's transmit power, flags indicating whether the device supports BR/EDR and BLE at the same time, etc. AdvData can also include "Manufacturer-Specific Data" (MSD) which is entirely unspecified by the Bluetooth SIG, with the exception that the MSD type data should begin with a 2-byte SIG-assigned company ID.

After passively collectable information is gathered in Step S400, Step S401 performs a process of selecting known packet types for protocols/Profiles of interest. This Step S401 is part of an iterative, active, process that repeats for every known protocol and Bluetooth Profile, whether Bluetooth-standardized or vendor-customized. So for instance the DIS 100 in Step S401 may select the BLE LL protocol in the first iteration, L2CAP protocol in the second iteration, SMP protocol in the third, and so on. After, or in parallel to BLE protocols, it may select BR/EDR protocols like LMP, SDP, RFCOMM, etc. Then it may switch to vendor-specific protocols such as Apple® LE Audio Protocol (LEAP), Wireless iPhone Accessory Protocol (WiAP), etc, as defined by data D110. Once it has exhausted all protocols, it will continue with all Profile-specific queries, e.g. for the Bluetooth-SIG-specified "A/V Remote Control Profile" followed by the "Asset Tracking Profile" followed by the "Basic Audio Profile", etc. Finally Step S401 will move on to vendor-specific Profiles, such as Silicon Labs® Over-The-Air (OTA) firmware update, as defined by data D110.

In Step S402 each individual packet type for the selected profile or Protocol is sent by the DIS 100 to gather information from the DTI. Example packet types are described herein which are not meant to be exhaustive, but are meant only to demonstrate examples of information that can be queried, and which have not been described in any prior known processes. As an example, assume that in Step S401 the DIS 100 has currently selected the L2CAP protocol. Within that protocol there is a packet type, L2CAP_LE_CREDIT BASED_CONNECTION_REQ, which can be sent from the DIS 100 to the DTI, to establish a type of connection, over which other data can be sent. In Step 402, the DIS would send the packet, and in Step S403 the DIS would determine whether the DTI responded or not. If no response is received, e.g., due to wireless interference or devices going out of range, this is recorded to the Database D120 in Step S404. If a response is received, it is checked in Step S405 if the response was an error message. If it was an error message, that would be recorded to the Database D120 in Step S407. If it wasn't an error message, then the response packet contents would be stored into Database D120 in Step S406. For an L2CAP_LE_CREDIT_BASED_CONNECTION_REQ packet sent by the DIS 100, the anticipated non-error response is a L2CAP_LE_CREDIT_BASED_CONNECTION_RSP packet. The specific fields of this packet can be distinct between different OSes, and therefore can provide some potential OS-identification information to contribute towards the DTI DID D118. After storing information about the DTI response, if any, the DIS 100 would check in Step S408 if there were more L2CAP packets to send, and if so return to Step S402 to continue sending different information queries.

Another representative example is if in Step S401 the DIS 100 has currently selected the LMP protocol. In Step S402 one of the possible LMP packet that can be sent is LMP_FEATURES_REQ. This is a feature request that can be sent by the DIS 100, and the expected response from the DTI is an LMP_FEATURES_RES response. Both packets have the same format and contents, which is a 64-bit bit-field. Every bit is either Reserved for Future Use (RFU) or corresponds to a specified feature that a DTI can indicate that it supports (bit set to 1) or doesn't support (bit set to 0). The exact combination of bits can be indicative of both specific Bluetooth chip vendors or Bluetooth chips. The DIS 100 would send a LMP FEATURES REQ in Step S402, determine if a response was received in Step S403, and record a lack of response, if applicable, in Step S404. If a response was received, it would be checked whether it was an error message in Step S405, and if so that would be recorded in Step S407, and if not, the actual response data would be recorded in Step S406. Afterwards it would check in Step S408 if there are more LMP packets to send, and if so return to Step S402 to continue sending different information queries.

At this present time there are 88 LMP packet types defined in the Bluetooth 6.0 Core Specification. With very few exceptions, almost all LMP packet requests and responses can provide useful information for creating a DID D118 for a DTI. It is to be noted that other protocols and packet types can be obtained and processed for the purpose of creating DIDs D118 as described herein without departing from the spirit and scope of the overall present inventive concept, as described herein.

This pattern of using almost all packet types for providing some useful information is repeated for all other protocol and Profile types. Previous systems, such as the ones cited in paragraph [0007] have been designed to simply request all information about a device from sources like GATT and AdvData, and then consider this information alone a DID D118. However, with the process described with reference to the example embodiment of FIG. 2, the DIS 100: 1) incorporates and synthesizes information across all protocol and Profile layers; 2) incorporates not just Bluetooth-SIG-specified protocol and Profile information, but vendor-specific non-public information; and 3) collects information from protocol and Profile layers (like LMP, L2CAP, SMP, etc.) which are not intrinsically meant to contribute to a DID D118 in the way that things like GATT or AdvData are.

As illustrated in FIG. 2A, it is not just literal received data at Step S406 which is considered as part of the DID D118. This process also collects information about whether no response is received from a device at Step S404, or whether a response indicating an error at Step S407 is received. While it is not always as useful as receiving an expected response, it can be just as much a part of the DID D118 that a DTI of a specific type may always choose not to respond to some packets, or may always respond with an error to some packets. Additionally, because of the use of the 2.4 GHz RF spectrum for not just Bluetooth but other data protocols such as WiFi, data transmissions are inherently subject to interference and potential packet loss. Likewise, a device could move out of range during attempted data collection. Therefore, sometimes a DTI's response may only partially fit a DID D118, due to missing data. It is needed to know whether a lack of a response is an intrinsic feature of a DID D118, or whether it could be explained by packet loss, and therefore the DTI should match a DID D118 with lower confidence due to an imperfect match.

Once each of the packet types for the given protocol/Profile layer have received a response (or determined a lack of response based on a timeout), the process illustrated in FIG. 2A can determine whether there are more packets to send from this protocol/Profile layer at Step S408. If there are more packets to send, the process in FIG. 2A returns to Step S402 and sends the next packet type. If there are not more packets to send, the process proceeds to Step S409 where it can be determined whether this protocol/Profile layer has behaviors which can be examined to aid in determining the DID D118. If the process of FIG. 2A (Step S204 of FIG. 2) determines at Step S409 that the Protocol/Profile has no known device-differentiating behaviors, then the process of FIG. 2A can check whether there are other protocol/Profile layers to query at Step S410. If it is determined at Step S410 that there are other protocol/Profile layers to query, then the DIS 100 returns to Step S401 and repeats the process for that protocol/Profile layer. If not, then active data collection is completed.

Figure 2B:
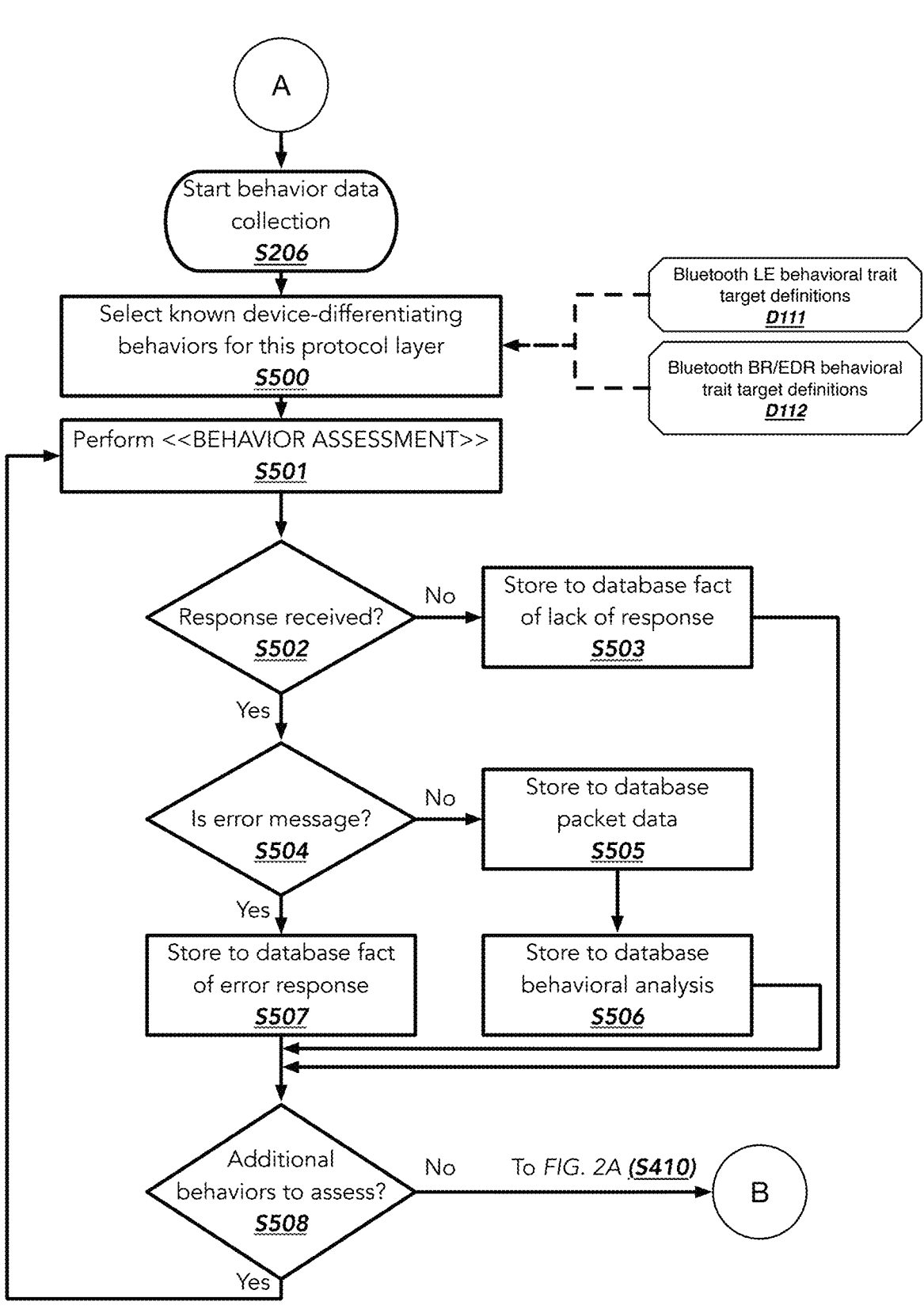
FIG. 2B illustrates a sub-process of behavioral-analysis against all protocol stack layers that can possibly be present, according to the example embodiment of FIG. 2.

If the process of FIG. 2A determines at Step S409 that the Protocol/Profile has known device-differentiating behaviors, then the process of FIG. 2A will proceed to a process illustrated in FIG. 2B, which illustrates a detailed process of Step S206 of FIG. 2.

There can be many device-differentiating behaviors at a given protocol layer. Therefore, Step S500 of FIG. 2B can select and prepare for exercising each such behavior.

Referring to FIG. 2B, Step S500 can select known device-differentiating behaviors for this protocol layer, from the data D111 for BLE or D112 for BR/EDR, depending on what type of analysis was being performed in FIG. 2A Step S409. Step S501 can then perform a concrete behavioral assessment of the DTI. The following are non-exhaustive representative examples of behavioral assessments. In paragraph [0047] it is described how the LMP_FEATURES_REQ is a 64-bit feature bit-vector sent by the DIS 100, and LMP_FEATURES_RES is the response sent back by the DTI. A possible behavior of the DTI would be if the features reported in the LMP_FEATURES_RES depend on the features sent by the DIS 100 in the LMP_FEATURES_REQ. So, for example, if the LMP_FEATURES_REQ has all bits set to 0, the DTI might send a different value for LMP_FEATURES_RES than if the LMP_FEATURES_REQ had all bits set to 1. Alternatively, the DTI could always send back exactly the same LMP_FEATURES_RES regardless of the value of LMP_FEATURES_REQ. Therefore, one example behavioral assessment that can take place in Step S501 is that the DIS 100 could explicitly send a different value for a LMP_FEATURES_REQ than was sent in the LMP_FEATURES_REQ at Step S402, and then record the behavioral response of whether the LMP_FEATURES_RES differed from that recorded in Steps S404 or S406. For example, the DIS 100 in Step S506 could record to Database D120 a 0x00 for a response that doesn't differ, and a 0x01 for a response that does differ. The DIS 100 could still also save the raw value received for LMP_FEATURES_RES in Step S505 (or errors in Step S507 or a lack of response in Step S503), because the response itself could differ from Bluetooth chip to chip, device model to model, based on specific firmware versions, or due to other factors.

Another example of behavioral analysis relates to inferring information about the internal state machine implementation of the software and firmware that runs on a DTI. The Bluetooth Core Specification has defined a number of finite state machines that are meant to describe states which devices can be in. For example, a diagram "State diagram of Link Controller" in the Bluetooth 6.0 specification indicates that a BR/EDR device can be in states of "Standby," "Synchronization Train," "Synchronization Scan," "Page," "Page Scan," "Inquiry," "Inquiry Scan," and "Connection." In all cases for all state machines, the state transitions are in response to specific packets that a device receives, or that it chooses to send based on user input. For example, a user who utilizes an interface within an operating system to discover nearby Bluetooth devices could put a BR/EDR device into the "Inquiry Scan" state, or a BLE device into the "Scanning" state. However, the exact packet or Host Controller Interface (HCI) sequences that induce transitions between states are not given in the Bluetooth specification state machine diagrams. Rather, that information is spread throughout the specification. Therefore, the present inventive concept can build up an idealized state diagram based on the sum totality of information in the Bluetooth specification. For example, for a BLE device, it may be discovered by the DIS 100 because it is in the "Advertising" state, and its advertisements were collected in Step S400. But the DIS 100 can then send a "CONNECT_IND" packet to initiate a connection to the DTI, and the DTI subsequently goes into the "Connection" state. Once in this state, many new substates become available for protocols which require no authentication or encryption. However other protocols like the L2CAP or the GATT Profile may require authentication or encryption to be established before full information can be queried. This in turn requires engaging the Security Manager Protocol (SMP) state machine, where a device can be paired or unpaired, bonded or unbounded, have no encryption, unauthenticated encryption, or authenticated encrypt, etc. Specific messages within the SMP like "Pairing Request," "Pairing Confirm," "Pairing Random," "Security Request," etc., can all move the DTI through its internal state machine. However, both invalid messages can be sent, or valid messages can be sent in invalid ordering compared to how exchanges are specified. This can reveal information about how the state machine of one device is implemented vs. another device.

Prior systems, such as that described in paragraph [0008] are not appropriate for performing device identification on demand for the hundreds or thousands of Bluetooth devices which are present in busy environments. In contrast, the DIS 100 of the example embodiment illustrated in FIG. 1 implements some related state machine inference mechanisms, but also adds a crucial missing component that has not been previously implemented. This is the capability to generate a "minimal-differentiator packet sequence" from the differences between two or more state machines. That is, if the full state machines for 10 very similar and related Bluetooth chips from the same vendor are obtained, the DIS 100 will perform a further analysis of the state machines to find the minimum packet sequence which will transit through states for all the provided devices and yield a series of responses which can be used to differentiate chip 1 vs. chip 2, etc. This minimal-differentiator sequence can be used by the DIS 100 on thousands of DTIs, as it is much more time efficient than attempting to infer the full state machine (on the order of seconds, not hours). This unique contribution by the DIS 100 is one of the novel features which makes such a system practical for behavioral analysis. Additionally, the DIS 100 of the example embodiment of FIG. 1 can perform state machine analysis not just on baseline Bluetooth Core Specification protocols like prior work, but also on Bluetooth Profiles, and vendor-specific protocols, such as the information as included in data D110 (see FIG. 2).

Still referring to FIG. 2B, it can now be understood in the context of the preceding examples that the nature of response data can vary significantly. More specifically, as with raw data, the baseline responses are to not receive any reply at Step S502, and to store that fact at Step S503, or to receive an error at Step S504 and to store that fact at Step S507. However, there are the more complicated cases of receiving data and storing the raw data at Step S505, as well as some behavior-dependent description of the observed device behavior at Step S506.

Step S508 assesses whether there are further behaviors to analyze within the current protocol/Profile layer. If so, the process of FIG. 2B returns to Step S501 to assess the next behavior, otherwise the process returns to Step S410 of FIG. 2A, where it will be determined whether there are any more protocol/Profile layers to analyze. If so then the process of FIG. 2a returns to Step S401 and repeats the process for that protocol/Profile layer. If it is determined in Step S10 that there are no more protocol/Profile layers to analyze, the process illustrated in FIG. 2A will complete the active data collection.

With Step S206 of FIG. 2 (the process of FIG. 2B) completed, Step S208 of FIG. 2 will begin. Step S208 will format all collected data for storage in Database D120. Also at Step S208 any raw data which has not already been stored in the Database D120 will now be stored there. This raw data is subsequently post-processed using Step S210 to extract meaningful semantic information. The input to Step S210 can be information about Bluetooth specification-defined protocols D113, Profiles D114, and custom-crafted vendor-specific data parsers or protocols D115. A public example of what a vendor-specific protocol parser could look like is given in "*Discontinued Privacy: Personal Data Leaks in Apple Bluetooth-Low-Energy Continuity Protocols*" (2020)

by Celosia and Cunche (https://petsymposium.org/popets/2020/popets-2020-0003.pdf). In that work the authors performed reverse engineering to determine the meaning behind Apple's "Manufacturer-Specific Data" (MSD) included in BLE AdvData. For instance, they found that they could extract messages about when Apple® AirPods had one or both earbuds in a person's ear rather than in the storage case. However, this past work has become out of date, and new message types have been introduced which have not been described in the open literature. The DIS 100 of FIG. 1 incorporates such up to date and non-public information about vendor-specific data protocols and information that has been found to be relevant to this system.

Some vendors like Microsoft publish specifications (https://learn.microsoft.com/en-us/openspecs/windows_protocols/ms-cdp/77b446d0-8cea-4821-ad21-fabdf4d9a569 and https://learn.microsoft.com/en-us/windows-hardware/design/component-guidelines/bluetooth-swift-pair) which describe their BLE MSD formatted data. However, these too can become out of date and not match observed information in actual packets. For example, the present inventive concept has observed D118 DID-relevant device names in such packets which are not described in the Microsoft specification (https://learn.microsoft.com/en-us/openspecs/windows_protocols/ms-cdp/77b446d0-8cea-4821-ad21-fabdf4d9a569) at the time of writing.

An example of a Bluetooth Profile which contains D118 DID-relevant information, that can be described in data D114, is the Device Identification Profile: (https://www.bluetooth.com/specifications/specs/device-id-profile-1-3/). This is a Profile which extends the Service Discovery Protocol (SDP) for BR/EDR systems. The Profile outlines data fields such as a 2-byte VendorID, 2-byte ProductID, 2 byte Version. The VendorID field can be either the Bluetooth-SIG-assigned company ID, or it can be the USB-SIG-assigned company ID (a VendorIDSource field indicates which one). This kind of information can directly tell us the product vendor and possibly the Bluetooth chip vendor (if the product vendor does not override their ID). The Version field in the Device Identification Profile has a specific format defined as "The value of the field is 0xJJMN for version JJ.M.N (JJ—major version number, M—minor version number, N—sub-minor version number); for example, version 2.1.3 is represented with value 0x0213". This information can provide useful supplemental information as part of the DID D118.

However, it should be understood that even Profiles that are not so directly related to device identification will often contain D118 DID-relevant information. This is why all Bluetooth Profiles have been analyzed for D118 DID-relevant information, and the data D114 incorporates collected information targeted at such information.

After all available semantic information has been extracted and processed at Step S210 (see FIG. 2), the data is fed into an Inference Engine (Step S212), which is described in more detail with reference to FIG. 2C.

Figure 2C:
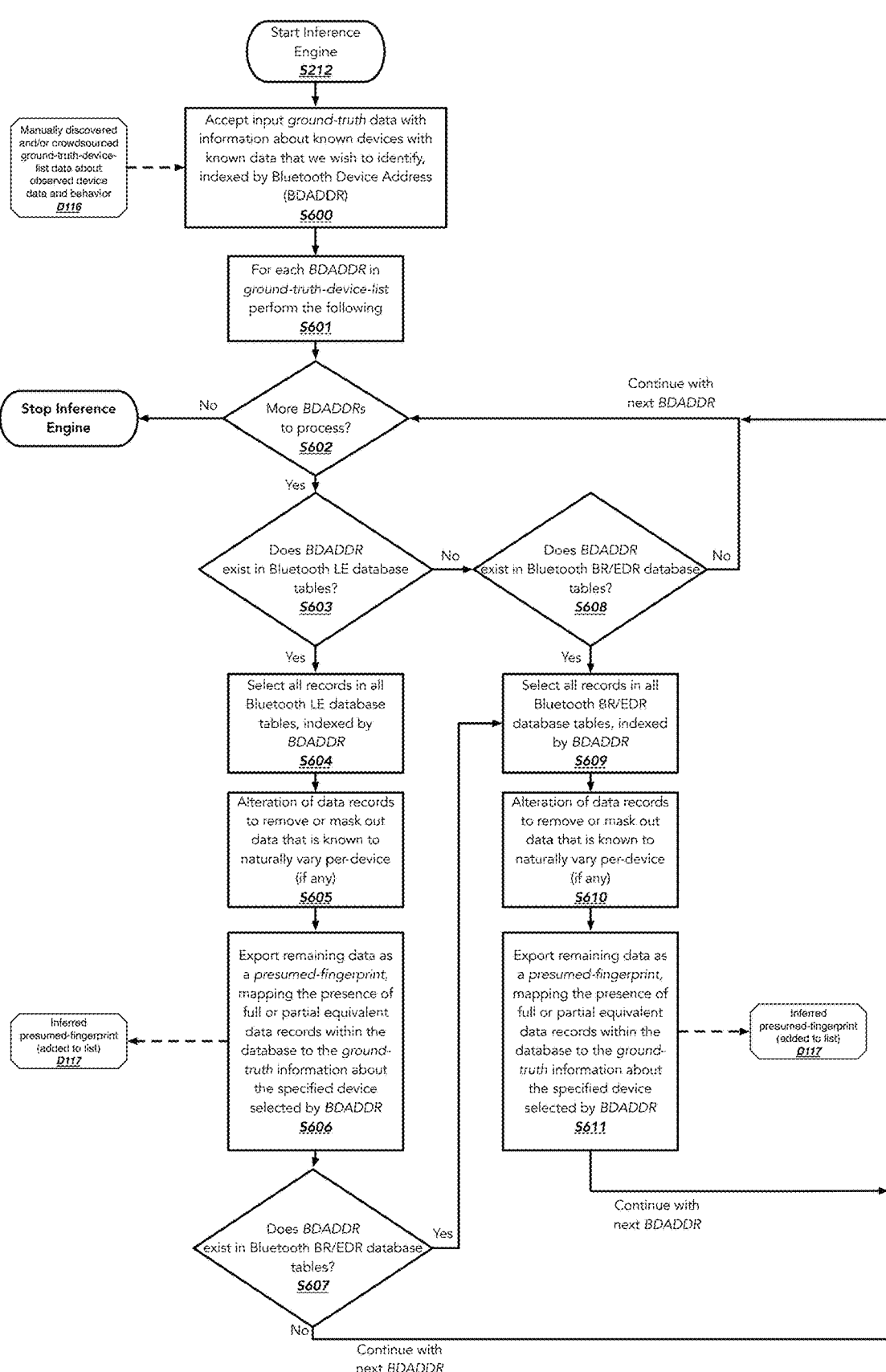
FIG. 2C illustrates an inference engine sub-process used within the process for synthesizing information about a Bluetooth device's identity, according to the example embodiment of FIG. 2.

Referring to FIG. 2C, the sub-process steps of the Inference Engine (Step S212) are as follows. Step S600 of this sub-process takes in the ground-truth data D116. This is information about known-correct DIDs D118 for devices based on their Bluetooth Device Address (BDADDR). The Database D120 uses the BDADDR as a unique index for each device it has seen. Accordingly, in Step S601 and Step S602 the process of FIG. 2C iterates through all ground-truth BDADDRs to see if the local database already stores information about that device. Step S603 begins by looking at all database tables that store BLE data, and determines whether any have data for the given BDADDR. If not, then the process proceeds to Step S608. But if any tables have information, then all such information is looked up in Step S604. In Step S605 it may be necessary, for certain types of data, to remove or mask out data which is known to naturally vary between two of the same devices or the same device over time. For instance, GATT data may contain a device-unique serial number. The literal serial number should be excluded when attempting to create a baseline DID D118 for a DTI. However, the fact of the existence of a serial number readable via GATT should be included. Similarly, a device may have a name that includes part of the BDADDR. The pattern of the name, excluding this BDADDR component, may be common across all the same devices. Therefore, if the BDADDR component is removed (or replaced with a regular expression which indicates that the byte pattern must match the BDADDR), then this name can serve as a portion of a DID D118. For example, Samsung® headphones may indicate that their literal name is "Galaxy Buds Pro (A42D)". The "Galaxy Buds Pro" portion is common across all such Samsung® headphones. But a more precise match can be given by the regular expression "^Galaxy Buds Pro \\\([A-F0-9]{4}\\\)$", where ^ indicates the start of a pattern, $ indicates the end of the pattern, [A-F0-9]{4} indicates 4 characters in the set uppercase A-F and numeric 0-9 (upper-case hexadecimal characters), and the "\" characters are used to "escape" the "(" and ")" characters so that they are interpreted as literal "(" and ")" characters rather than causing them to be interpreted according to special regular expression rules. This regular expression can then be enhanced with additional metadata that signals a match should only occur if the 4 characters with the [A-F0-9]{4} pattern match within the device name also match the 4 least-significant characters of the BDADDR. This would yield a DID D118 which is maximally-precise for matching that a device is a pair of Samsung® Galaxy Buds Pro headphones.

In Step S606 the full information which is present in the database D120, after mapping in Step S606, is exported by adding this presumed-fingerprint to a list of presumed-fingerprints D117. Note, the presumed-fingerprint contains most of the same information as a DID D118, but it is not the same thing. A presumed-fingerprint is data which is generated from the ground-truth data, and therefore the confidence in the data is near 100% (with the recognition that some naturally-changing data may not be initially accounted for and may need to be updated as an understanding of the data improves.) The DID D118 generally has less confidence because it may match a single presumed-finger-print completely, a single or multiple presumed-fingerprints partially, or no presumed-fingerprints at all.

Still referring to FIG. 2C, in Step S607 the system determines whether the given BDADDR is found in any BR/EDR database tables. If not, the system returns to Step S602 and processes the next BDADDR. If yes, then the system proceeds to Step S609. It should be noted that there are 4 types of BDADDRs in BLE, only one of which, a "public" BDADDR, can be used for both BLE and BR/EDR. Therefore, a given BDADDR may appear only in BLE, only in BR/EDR, or in both database tables.

In Step S609 all records of all information for the given BDADDR are collected. In Step S610 the information is removed or masked as needed the same as was performed for Step S605. And then in Step S611 the information is added to the inferred presumed-fingerprint list D117. At this point it is known that either the information from BLE for this BDADDR has already been processed, or does not exist, so the process returns to Step S602. And in Step S602 when it eventually has processed all BDADDRs in the ground-truth data, the process stops the Inference Engine, and the system continues from Step S214 of FIG. 2.

Referring to FIG. 2, in Step S214 the system now has available to it all information about all currently discoverable devices from Step S202, as well as all available raw information collected in Step S204 and post-processed in Step S210, as well as all available behavioral information collected in Step S206, as well as all available presumed-fingerprints from Step S212 output (at the Inference Engine) as D117.

The system is now ready to synthesize this information to create a DID D118 for each DTI. As mentioned earlier a DID D118 may match a single presumed-fingerprint from D117 completely, a single or multiple presumed-fingerprints partially, or no presumed-fingerprints at all. When a DID D118 matches a single presumed-fingerprint completely the confidence is reported according to the stored ground-truth confidence. When ground-truth data is created by the system creators, the confidence is 100%. But because the ground-truth data can be received from external entities via a crowd-sourcing system, the confidence associated with that data may be rated as less than 100%, based on user reputation, manual assessment indicating it is trustworthy or not, etc. However, the confidence can increase if multiple users submit matching ground-truth data.

When a DID D118 is a partial match of multiple presumed-fingerprints, the confidence is reported according to a scoring system which could involve statistical techniques such as weighted averages, Bayesian inference, machine learning, etc. When a DID D118 does not match any available presumed-fingerprints, the system reports confidence both on a per-field basis and for the overall DID D118 based on weighting of individual pieces of data which are available. For instance, if the full data for a minimum-differentiator packet series is available, this can yield high confidence that a given Bluetooth chip is the chip which is reported. Or if there are multiple fields which yield the same manufacturer (e.g. both GATT and the IEEE Organizationally Unique ID (OUI) data associated with a "public" type BDADDR), then this too would be reported with high confidence. But if there are conflicting fields, e.g., if the BDADDR indicates a company of "Qualcomm®", but a GATT field reported a company of "Bose®", then more complicated rules are used to differentiate fields which are known to contain Bluetooth chip-maker company IDs more frequently. Therefore, Step S214 will incorporate all rules for the collection of all DID D118 fields, as well as reporting confidence in the overall DID D118 and individual field's confidence.

As shown in D118 of FIG. 2, there are many types of information which can end up incorporated into the final DID D118 for a DTI. These can include, but are not limited to, the Bluetooth chip-maker, specific chip model and revision, the Bluetooth module[1]-maker, specific module model, the device-maker, the device model, the software and firmware versions, the "appearance" of the device (according to values pre-specified by the Bluetooth Core Specification), the capabilities and services provided by the device, and the confidence in the assessment of the preceding.

Once a final DID D118 is created for a given DTI, this created DID D118 is exposed to the user of the system. This can be performed via a desktop PC graphical user interface, a command line interface, a web application interface, a phone application interface, or other computing devices with a graphic user interface. Finally in Step S216 the information about the DID D118 and any additional data D119 is made available for exporting to a crowdsourcing system. This can be performed via peer-to-peer transactions between DISes, or can be performed via sending to a centralized server from which DID D118 information can be sent and received.

Figure 3:
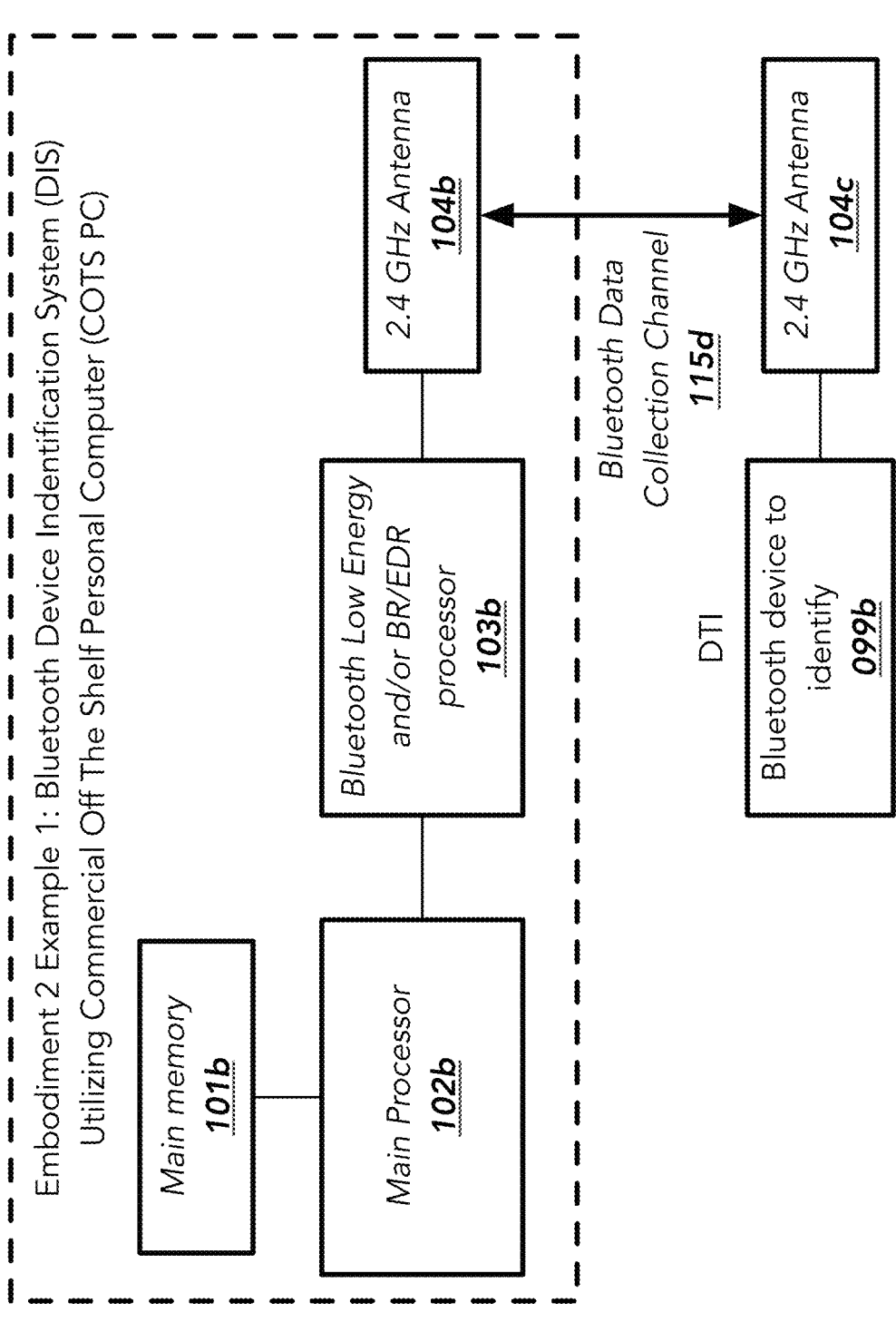
FIG. 3 illustrates a system for synthesizing information about a Bluetooth device's identity, according to another example embodiment of the present inventive concept.

FIG. 3 illustrates a system for synthesizing information about a Bluetooth device's identity, according to another example embodiment of the present inventive concept. This figure shows how system less-capable than FIG. 1 can be built using commercial off-the-shelf (COTS) components, such as exist in a Personal Computer (PC). Such a system could have a main memory 101b where software or firmware can be stored and run from. It could have a main processor 102b which can run the specified software or firmware. It could have Bluetooth chips, which could be distinct from the main processor as in 103b, which may be capable of supporting only one of, or both of, BLE and BR/EDR. The Bluetooth processor must be connected to an antenna 104b, allowing it to send and receive wireless transmissions over longer distances. The communication channel via Bluetooth wireless signals 115d is to and from the antenna 104c of a DTI 099b.

COTS systems have numerous limitations when building a DIS. Their Bluetooth processor may not support both BR/EDR and BLE. Their antenna design may have been optimized for achieving a small physical footprint, rather than optimizing to maximize received signal. They may transmit at lower power than the maximum allowed by wireless regulations, thus their signal may not reach the DTI. The firmware which exists on their Bluetooth chip will most likely be sanity checking packets which are to be transmitted over the air, and rejecting packets which do not conform to the Bluetooth specification. And their Bluetooth chips will most likely not be capable of tuning to multiple radio frequencies simultaneously, but will instead hop between frequencies in a pattern defined in the Bluetooth specification.

Figure 4:
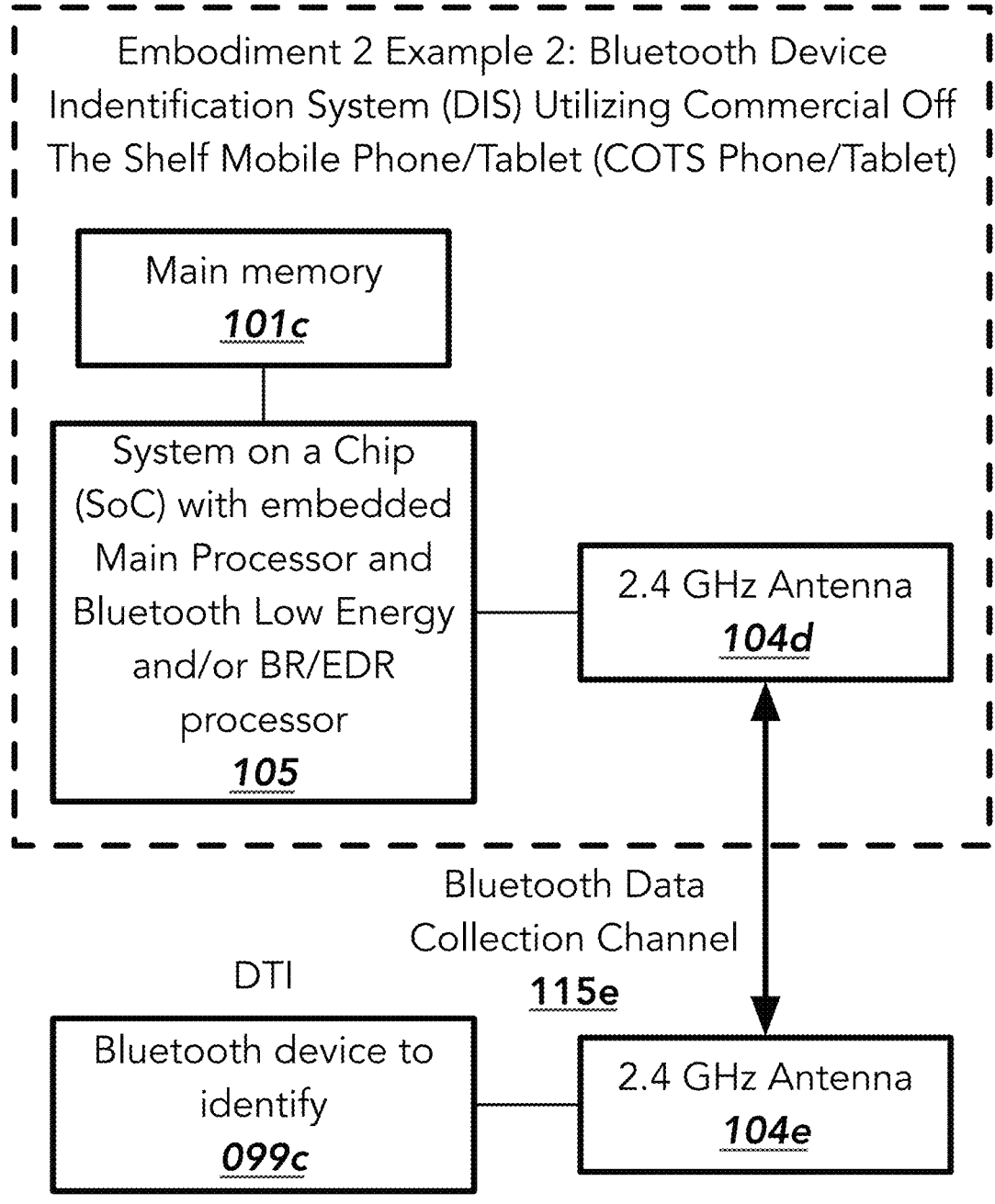
FIG. 4 illustrates a system for synthesizing information about a Bluetooth device's identity, according to still another example embodiment of the present inventive concept.

FIG. 4 illustrates a system for synthesizing information about a Bluetooth device's identity, according to still another example embodiment of the present inventive concept. This figure shows how a less-capable system than FIG. 1 can be built using commercial off-the-shelf (COTS) components, such as exist in a mobile phone or tablet. Such a system would share many of the limitations described in paragraph [0069]. Such a system could have a main memory 101c where software or firmware can be stored and run from. It could have a main processor 105 which can run the specified software or firmware. It could have a Bluetooth chip or chips that are logically distinct from the main processor, but which are packaged together as a single discrete System on a Chip (SoC). These Bluetooth chips may be capable of supporting only one of, or both of, BLE and BR/EDR. The Bluetooth processor must be connected to an antenna 104d, allowing it to send and receive wireless transmissions over longer distances. The communication channel via Bluetooth wireless signals 115e is to and from the antenna 104e of a DTI 099c.

Figure 5:
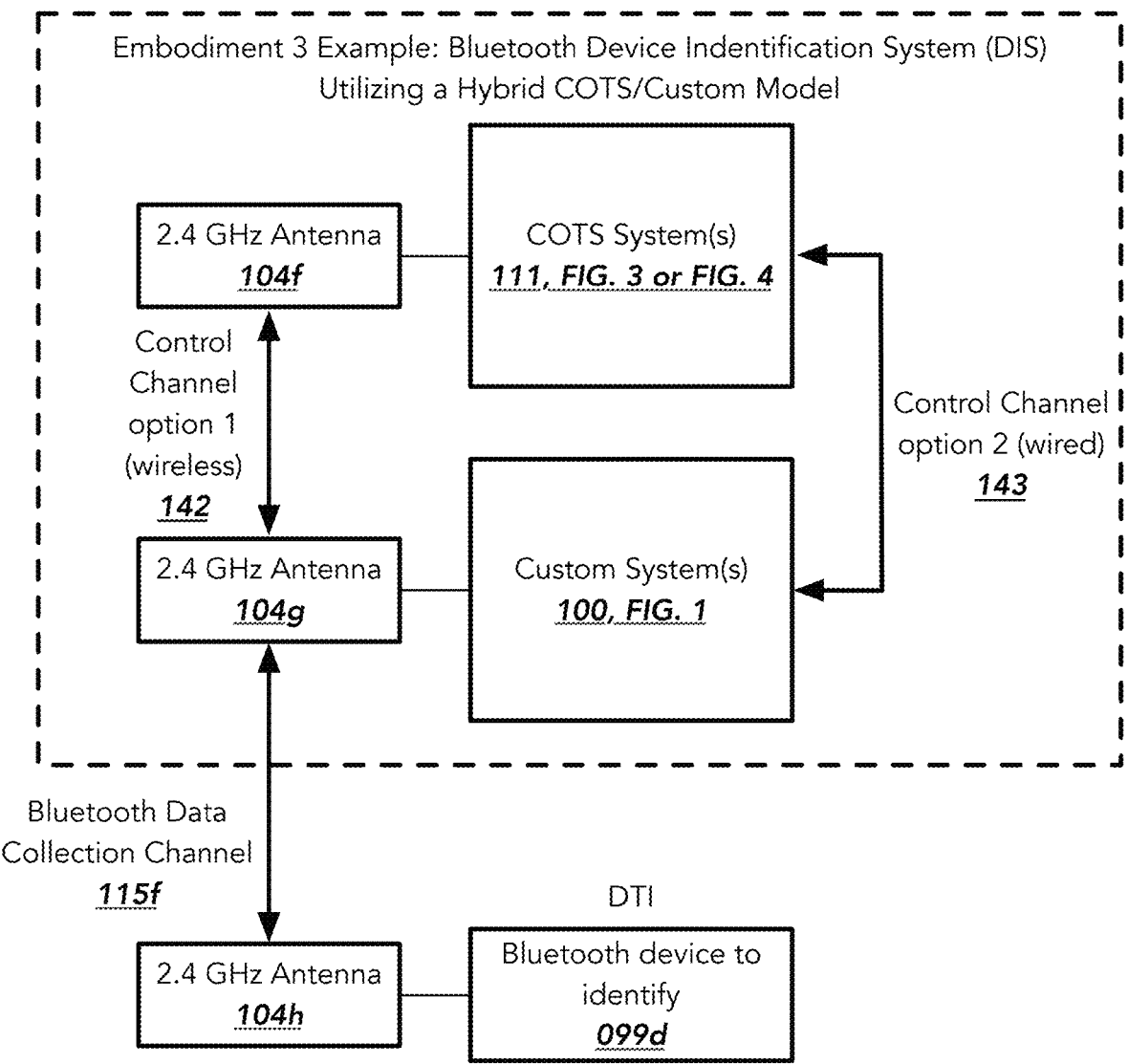
FIG. 5 illustrates a system for synthesizing information about a Bluetooth device's identity, according to yet another example embodiment of the present inventive concept.

FIG. 5 illustrates a system for synthesizing information about a Bluetooth device's identity, according to yet another example embodiment of the present inventive concept. This system represents a hybridization between a customized and maximally-capable system described in FIG. 1 100, and COTS-based systems such as those shown in FIG. 3 or FIG. 4 shown as 111. The hybridization of these different designs can be undertaken to overcome the inherent limitations of COTS systems, while benefitting from cost savings associated will mass-produced COTS systems, such as decreased prices for memory, compute, display, and other capabilities. One system, 100 or 111, would be in ultimate control, and be responsible for sending commands to the other system. These commands, and the data returned after execution of the commands, could be transferred via wired control channel 143 or a wireless control channel 142. The wireless control channel could opportunistically take advantage of existing required wireless antenna capabilities such as the 2.4 GHz Bluetooth antenna 104f connected to 111, or 104g connected to 100. However, alternative wireless control channels could also be used, so as not to conflict with Bluetooth signals. As in other systems there would continue to be a necessary Bluetooth wireless channel 115f to communicate with the DTI 099d, via its Bluetooth antenna 104h, for the purposes of information collection.

The present general inventive concept can be embodied as computer-readable codes on a non-transient computer-readable medium. The non-transient computer-readable medium can include a computer-readable recording medium and a computer-readable transmission medium. The computer-readable recording medium is any data storage device that can store data as a program which can be thereafter read by a specifically configured computer system that can perform the functions as described with reference to the DIS 100 as illustrated in FIG. 1. Examples of the computer-readable recording medium include a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled specifically configured computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A Bluetooth device identification system (DIS), comprising:
    a memory to store programs to run process steps;
    a database to store received data from devices to identify (DTI);
    one or more Bluetooth chip processors configured with a transceiver that discovers nearby Bluetooth communication DTI of type Low Energy (BLE) and Basic Rate/Enhanced Data Rate (BR/EDR) which are in the area;
    a collection channel connected to each of the one or more Bluetooth chip processors to collect data received from the discovered DTIs;
    a main processor configured to execute process steps including:
        selecting known packet types for protocols/profiles of interest received from the discovered DTIs,
        transmitting each individual packet type externally to gather information from the discovered DTIs, and receiving responses, including protocol/profile layers, to each of the transmitted packet types from the DTIs and storing the received responses in the database;

determining whether the received protocol/profile layers have behaviors which can be used to determine a device identification (DID);

selecting known device-differentiating behaviors for each of the received protocol/profile layers;

performing a behavioral assessment of the DTI; and formatting collected data to store in the database.

2. A Bluetooth device identification system (DIS), comprising:

a memory to store a program, the program comprising a set of instructions, each of the instructions corresponding to one or more process steps;

a database stored in the memory to store and/or track response data values from Bluetooth devices to be identified (DTI), the response data values generated by sending an inquiry packet to one or more DTI and, if a response packet is received, storing an actual response packet value;

one or more Bluetooth chip processors configured with a transceiver that discovers Bluetooth DTI of type Low Energy (BLE) and/or Basic Rate/Enhanced Data Rate (BR/EDR) which are in an area;

a collection channel connected to each of the one or more Bluetooth chip processors to collect data received from the discovered DTI;

at least one processor configured to execute the program and thus the process steps, the process steps including:

selecting one or more known inquiry packet types for one or more protocols and/or profiles of interest received from the discovered DTIs, transmitting each selected individual inquiry packet type to at least one of the discovered DTI to generate response packets from the discovered DTI;

receiving one or more response packets, including protocol and/or profile information, from the DTI in response to each of the inquiry packet types and storing the corresponding response data values in the database; and formatting collected data to store in the database.

3. The Bluetooth device identification system (DIS) of claim 2, wherein the database can also store a corresponding no-response packet value if no response packet is received in response to any given inquiry packet.

4. The Bluetooth device identification system (DIS) of claim 2, wherein the process steps further comprise:

determining whether any of the received protocol/profile layers have behaviors which can be used to determine a device identification (DID);

selecting known device-differentiating behaviors for each of the received protocol/profile layers which have such behaviors; and performing a behavioral assessment of the DTI to collect additional response data values.

5. The Bluetooth device identification system (DIS) of claim 2, wherein the database can also store a corresponding no-response packet value if no response packet is received in response to any given inquiry packet, and wherein the process steps further comprise:

determining whether the received protocol/profile layers have behaviors which can be used to determine a device identification (DID);

selecting known device-differentiating behaviors for each of the received protocol/profile layers; and performing a behavioral assessment of the DTI to collect additional response data values.

6. The Bluetooth device identification system (DIS) of claim 5, wherein the process steps further comprise:

determining whether it is more likely that no response packet was received in response to a given inquiry packet due to packet loss in transmission, or due to an error of response by a given DTI, or due to the given DTI not having a corresponding response value for the given inquiry packet;

using the determination of the previous step as a factor in determining known device-differentiating behaviors for each of the received protocol/profile layers; and including the known device-differentiating behaviors determined in the previous step as part of the behavioral assessment of the DTI to collect additional response data values.

7. The Bluetooth device identification system (DIS) of claim 2, wherein at least one of the inquiry packet types has more than one possible valid configuration, and wherein the process steps further comprise:

sending at least one of the inquiry packets in at least two valid configurations to obtain a first response packet having a first response data value and a second response packet having a second response data value;

comparing the first response data value and the second response data value to produce a differentiation value and using the differentiation value as a factor in determining known device-differentiating behaviors for each of the received protocol/profile layers; and including the known device-differentiating behaviors determined in the previous step as part of the behavioral assessment of the DTI to collect additional response data values.

8. The Bluetooth device identification system (DIS) of claim 2, wherein the Bluetooth chip processors can also passively detect one or more independent packets transmitted by Bluetooth DTI in the area, each independent packet having an independent data value, and can store the independent data packet values in the database.

9. The Bluetooth device identification system (DIS) of claim 4, wherein the Bluetooth chip processors can also passively detect one or more independent packets transmitted by Bluetooth DTI in the area, each independent packet having an independent data value, the Bluetooth chip processors can store the independent data packet values in the database, and the independent data packet values can be used as a second factor in determining known device-differentiating behaviors for a given DTI.

10. The Bluetooth device identification system (DIS) of claim 2, wherein the Bluetooth DIS can transmit one or more bad inquiry packets, the bad inquiry packets being purposefully configured to be nonconforming with one or more otherwise valid Bluetooth protocols and/or Bluetooth standards, and wherein the response packets sent by a given DTI in response to a bad inquiry packet produce bad inquiry response data values which can be stored in the database.

11. The Bluetooth device identification system (DIS) of claim 4, wherein the Bluetooth DIS can transmit one or more bad inquiry packets, the bad inquiry packets being purposefully configured to be nonconforming with one or more otherwise valid Bluetooth protocols and/or Bluetooth standards, and wherein the response packets sent by a given DTI in response to a bad inquiry packet produce bad inquiry response data values which can be used as a second factor in determining known device-differentiating behaviors for a given DTI.

12. The Bluetooth device identification system (DIS) of claim 2, wherein at least one of the inquiry packet types is a state machine inquiry packet that can affect a full state machine configuration of a given DTI, wherein the full state machine configuration of the given DTI in response to receiving a given state machine inquiry packet can be determined by the DIS to produce a full state machine response value, and wherein the full state machine response value can be stored in the database.

13. The Bluetooth device identification system (DIS) of claim 4, wherein at least one of the inquiry packet types is a state machine inquiry packet that can affect a full state machine configuration of a given DTI, wherein the full state machine configuration of the given DTI in response to receiving a given state machine inquiry packet can be determined by the DIS to produce a full state machine response value, and wherein the full state machine response value can be used as a second factor in determining known device-differentiating behaviors for the given DTI.

14. The Bluetooth device identification system (DIS) of claim 12, wherein the DIS either stores or dynamically generates a minimal-differentiator packet sequence (MDPS) which can be used to determine a sequence of inquiry packets which will differentiate two or more DTI which have full state machine configurations which are within an arbitrary degree of similarity.

15. The Bluetooth device identification system (DIS) of claim 13, wherein the DIS either stores or dynamically generates a minimal-differentiator packet sequence (MDPS) which can be used to determine a sequence of inquiry packets which will differentiate two or more DTI which have full state machine configurations which are within an arbitrary degree of similarity.

16. The Bluetooth device identification system (DIS) of claim 2, wherein the process steps further comprise:

determining whether any given DTI has and/or will transmit (ted) any response packets which include at least one device-specific actual value and if so masking out the device-specific actual value when the corresponding response data value is stored in the database.

17. The Bluetooth device identification system (DIS) of claim 4, wherein the process steps further comprise:

determining whether any given DTI has and/or will transmit (ted) any response packets which include at least one device-specific actual value and if so masking out the device-specific actual value when the corresponding response data value is stored in the database; and using one or more properties of at least one of the response data values including a masked-out device-specific actual value, including but not limited to whether any of the response data values include such masked-out data values at all, as a second factor in determining known device-differentiating behaviors for the given DTI.

18. The Bluetooth device identification system (DIS) of claim 2 wherein the processor, the memory, and at least one Bluetooth chip processor and/or a field programmable gate array which can receive and interpret Bluetooth signals are part of a single integrated circuit.

19. The Bluetooth device identification system (DIS) of claim 4 wherein the processor, the memory, and at least one Bluetooth chip processor and/or field programmable gate array which can receive and interpret Bluetooth signals are part of a single integrated circuit.

20. The Bluetooth device identification system (DIS) of claim 12 wherein at least two of the full state machine configurations possible to be present on a given DTI are identical on the edges, but have different internal substate configurations, such that the given DTI can be more accurately identified by determining its actual substate configuration in response to a given state machine inquiry packet.

\* \* \* \* \*